United States Patent
Matsuzawa et al.

(10) Patent No.: US 9,389,386 B2
(45) Date of Patent: Jul. 12, 2016

(54) MANUFACTURING METHOD OF OPTICAL FIBER RIBBON, MANUFACTURING DEVICE FOR OPTICAL FIBER RIBBON IMPLEMENTING SAID MANUFACTURING METHOD, AND OPTICAL FIBER RIBBON MANUFACTURED WITH SAID MANUFACTURING METHOD

(71) Applicants: FUJIKURA LTD., Koto-ku, Tokyo (JP); NIPPON TELEGRAPH AND TELEPHONE CORPORATION, Chiyoda-ku, Tokyo (JP)

(72) Inventors: Takashi Matsuzawa, Sakura (JP); Yukiko Take, Sakura (JP); Ken Osato, Sakura (JP); Naoki Okada, Yotsukaido (JP); Yusuke Yamada, Tsukuba (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 297 days.

(21) Appl. No.: 13/768,604

(22) Filed: Feb. 15, 2013

(65) Prior Publication Data
US 2013/0156390 A1     Jun. 20, 2013

Related U.S. Application Data

(63) Continuation of application No. PCT/JP2011/068427, filed on Aug. 12, 2011.

(30) Foreign Application Priority Data

Aug. 19, 2010 (JP) ................................. 2010-184307

(51) Int. Cl.
G02B 6/44 (2006.01)

(52) U.S. Cl.
CPC .............. *G02B 6/448* (2013.01); *G02B 6/4403* (2013.01); *G02B 6/4404* (2013.01); *G02B 6/4405* (2013.01)

(58) Field of Classification Search
None
See application file for complete search history.

(56) References Cited

U.S. PATENT DOCUMENTS 8,548,294 B2 * 10/2013 Toge et al. .................... 385/114

FOREIGN PATENT DOCUMENTS

| JP | 4143651 B2 | 9/2008 |
| JP | 2010-002743 A | 1/2010 |

(Continued)

OTHER PUBLICATIONS

Machine English translation of JP 2010-033010, the JP reference submitted with the IDS dated Nov. 24, 2014.*

(Continued)

*Primary Examiner* — John M Bedtelyon
(74) *Attorney, Agent, or Firm* — Sughrue Mion, PLLC

(57) ABSTRACT

A manufacturing method for an optical fiber ribbon, in which: a plurality of optical fibers are arranged in parallel and the neighboring optical fibers are partially coupled with each other at given intervals in a longitudinal direction to form a subunit; and the optical fibers positioned at side edges of the neighboring subunits are partially coupled with each other at a given intervals in the longitudinal direction, includes: sending out the optical fibers in a parallel manner with intervals provided therebetween, applying an uncured resin to the optical fibers, continuously changing positions at which the uncured resin is interrupted by a plurality of interrupt members, and forming coupled portions at which the optical fibers are coupled to each other by irradiating resin curing energy, wherein a moving period or phase of the interrupt members is changed for every arbitrary optical fibers.

8 Claims, 12 Drawing Sheets

(56) References Cited

FOREIGN PATENT DOCUMENTS

| | | |
|---|---|---|
| JP | 2010-033010 A | 2/2010 |
| WO | 2010/001663 A1 | 1/2010 |

OTHER PUBLICATIONS

Office Action issued by the New Zealand Patent Office in New Zealand Application 607312 dated Aug. 29, 2013.

Office Action issued by Chinese Patent Application in Chinese Application No. 201180040168.X mailed Sep. 1, 2014.

Kazuo Hogan, et al. "Ultra-high density optical fiber cables using rollable 20-fiber ribbons", The Institute of Electronics, Information and Communication Engineers Technical Report, vol. 109, No. 428, issued on Feb. 19, 2010, and its English translation.

Kazuo Hogan, et al., "Ultra-High-Density Optical Fiber Cables with Rollable 20-fiber Ribbons", Proceedings of the 2010 Institute of Electronics, Information and Communication Engineers General Conference, Communication 2, issued on Mar. 2, 2010 and its English translation.

Office Action issued by the Australian Patent Office in Australian Patent Application No. 2011291785 dated Jul. 23, 2013.

\* cited by examiner

MANUFACTURING METHOD OF OPTICAL FIBER RIBBON, MANUFACTURING DEVICE FOR OPTICAL FIBER RIBBON IMPLEMENTING SAID MANUFACTURING METHOD, AND OPTICAL FIBER RIBBON MANUFACTURED WITH SAID MANUFACTURING METHOD

CROSS-REFERENCE TO RELATED APPLICATIONS

The application is a Continuation of PCT Application No. PCT/JP2011/068427, filed on Aug. 12, 2011, and claims the benefit of priority from the prior Japanese Patent Application No. 2010-184307, filed on Aug. 19, 2010, the entire contents of which are incorporated herein by reference.

BACKGROUND OF THE INVENTION

The present invention relates to a manufacturing method of an optical fiber ribbon in which a plurality of optical fiber core cables are arranged in parallel and coupled, a manufacturing device for an optical fiber ribbon implementing the manufacturing method and an optical fiber ribbon manufactured with the manufacturing method.

Conventionally, an optical fiber ribbon as shown in FIG. 14 has been proposed, in which a plurality of subunits 53, each of which are formed by covering a plurality of optical fiber core cables 51 with a covering portion 52 in an entire length in a longitudinal direction, are assembled. The plurality of subunits 53 are integrally fixed over the entire length in the longitudinal direction by a coupling/covering portion 54. An optical fiber ribbon 50 thus formed can be divided into the separate subunits 53 by breaking the coupling/covering portion 54. The optical fiber ribbon 50 has good workability regarding connection of the respective subunits 53.

Incidentally, recent growth in optical fiber cable network has become a factor to increase demands for efficient use of conduits and the like as an optical fiber cable network infrastructure, cost reduction of network construction goods themselves, and cost reduction of cabling (construction), and so on.

For the efficient use of conduits and the like, the optical fiber cables, which are main goods used in constructing the optical fiber cable network, need to become thinner and more densified. Further, for the cost reduction of network construction goods themselves, a manufacturing cost of the optical fiber cables needs to be reduced. Also, for the cost reduction of cabling (construction), the optical fiber cables need to be handled easier, in addition to being made thinner and more densified.

In order to thin and density each of the optical fiber cables, one needs to be put into practice, in which packaging density of optical fiber core cables in the optical fiber cable is increased, so that an outer diameter of the optical fiber cable becomes smaller even when a number of optical fiber core cables used remains the same. The above-described optical fiber ribbon 50 is difficult to be deformed in a width direction and warps greatly by being curled and folded; therefore, the configuration thereof is not suitable for being used as an optical fiber cable.

As an optical fiber ribbon suitable for being used as an optical fiber cable, as shown in FIGS. 15A and 15B, an optical fiber ribbon 60 is disclosed in Japanese Patent No 4143651, in which a plurality of optical fiber core cables 61 are arranged in parallel and the neighboring optical fiber core cables 61 are coupled to each other by coupled portions 62 at given intervals in the longitudinal direction.

The optical fiber ribbon 60 in which the optical fiber core cables 61 are coupled at given intervals is deformed easily in the width direction, and warp caused when being curled and folded can be suppressed as much as possible. Accordingly, the optical fiber ribbon 60 can be thinned, densified and lightened when applied as an optical fiber cable, and is suitable for being used as the optical fiber cable.

In order to reduce the manufacturing cost of optical fiber cables, it is effective to configure one optical fiber ribbon with as much optical fiber core cables as possible. For example, to configure 200-core optical fiber cable, 50 sheets of optical fiber ribbons are required when using 4-core optical fiber core cables. However, only 25 sheets of the optical fiber ribbons are required when using 8-core optical fiber core cables, and only 10 sheets of the optical fiber ribbons are needed when using 20-core optical fiber core cables. In other words, the more the number of cores of the optical fiber core cables is used, the less the number of sheets of the optical fiber ribbon is required upon configuring the optical fiber cable. This can reduce the manufacturing cost of the optical fiber cables.

The optical fiber ribbon 60 as mentioned above, in which the neighboring optical fiber core cables 61 are coupled to each other by the coupled portions 62 at given intervals in the longitudinal direction, is effective to meet the above demands. However, regarding the optical fiber ribbons as such, distinguishability of each of the optical fiber core cables becomes a problem upon handling.

That is, in facilities in the optical fiber cable network, a technique is generally used in which optical fiber core cables are connected with each other in a bundle of plurality of cables to enhance construction efficiency. For this reason, a fusion splicer for collectively connecting a plurality of optical fiber core cables and a mechanically transferable (MT) connector which is an optical connector for collective connection of multi-core cables, and the like are used. However, a number of connection cores of the connectors does not necessarily coincide with a number of the optical fiber core cables arranged in the optical fiber cable. Further, it is essential that connection can be made by a unit of number of cores made by dividing the total number of cores. From this aspect, the optical fiber ribbon configured by a plurality of subunits as described above is effective upon cabling.

Moreover, in order to improve the distinguishability of each of the subunits, coatings of the optical fiber core cables are colored with an ultraviolet curing resin and the like so that the cables are distinguished by colors. However, a number of available colors is not infinite and only a limited number of colors is used to keep distinguishability. Accordingly, the subunits are distinguished from each other by combination of colors of the optical fiber core cables configuring the subunits.

SUMMARY

In the optical fiber ribbon as described above, in which the neighboring optical fiber core cables are coupled to each other by the coupled portions at given intervals in the longitudinal direction, the optical fiber core cables which are not coupled to each other are not integrally formed, and are respectively in a single-core state. Accordingly, in the optical fiber ribbon as such, it is difficult to distinguish the subunits from each other by the combination of colors of the optical fiber core cables. If the subunits are difficult to be distinguished from each other, construction operation becomes difficult, and further, the construction cost increases.

Accordingly, regarding the optical fiber ribbon in which the neighboring optical fiber core cables are coupled to each other by the coupled portions at given intervals in the longitudinal direction, a multi-core optical fiber ribbon in which subunits are easily distinguished from each other and a manufacturing method of the optical fiber ribbon as such are desired.

The present invention is made in consideration of the above problems and circumstances, and it is an object of the present invention to provide: a manufacturing method of a multi-core optical fiber ribbon in which a plurality of optical fiber core cables are arranged in parallel and the neighboring optical fiber core cables are coupled to each other at given intervals, wherein subunits are easily distinguished from each other; a manufacturing device for an optical fiber ribbon implementing the manufacturing method; and an optical fiber ribbon manufactured with the manufacturing method.

(Configuration 1)

A manufacturing method for an optical fiber ribbon, in which: a plurality of optical fiber core cables are arranged in parallel and the neighboring optical fiber core cables are partially coupled with each other at given intervals in a longitudinal direction to form a subunit; and the optical fiber core cables positioned at side edges of the neighboring subunits are partially coupled with each other at a given intervals in the longitudinal direction, comprises: a resin applying step for sending out the plurality of the optical fiber core cables in a parallel manner with intervals provided therebetween, in the longitudinal direction of the optical fiber core cables, applying an uncured resin to the plurality of the optical fiber core cables, moving a plurality of interrupt members which are arranged corresponding to positions between each of the optical fiber core cables to interrupt the uncured resin, and continuously changing positions at which the uncured resin is interrupted and positions at which the uncured resin is ejected without interruption by the interrupt members; and a resin curing step for irradiating positions, at which the plurality of the optical fiber core cables are arranged in parallel, concentrated and in contact with each other, with resin curing energy required for the uncured resin coated on the optical fiber core cables to cure, thereby forming coupled portions at which the optical fiber core cables are coupled to each other, wherein a moving period or phase of the interrupt members is changed for every arbitrary optical fiber core cables.

(Configuration 2)

In the manufacturing method of the optical fiber ribbon having the configuration 1, upon applying the resin for coupling the optical fiber core cables configuring the subunit with each other, movements of the respective interrupt members are set to a first period and set to different phases with each other, and upon applying the resin for coupling the subunits with each other, movements of the respective interrupt members are set to a second period which is longer than the first period and set to different phases with each other.

(Configuration 3)

In the manufacturing method of the optical fiber ribbon having the configuration 1, upon applying the resin for coupling the optical fiber core cables configuring the subunit with each other, movements of the respective interrupt members are set to: a first period; and different phases with each other for the coupling of the neighboring optical fiber core cables in a width direction of the optical fiber ribbon, and upon applying the resin for coupling the subunits with each other, movements of the respective interrupt members are set to a second period which is longer than the first period.

(Configuration 4)

An optical fiber ribbon according to the present invention is manufactured with the manufacturing method of the optical fiber ribbon having any one of the configurations 1 to 3.

(Configuration 5)

A manufacturing device for an optical fiber ribbon, in which: a plurality of optical fiber core cables are arranged in parallel and partially coupling the neighboring optical fiber core cables are partially coupled with each other at given intervals in a longitudinal direction to form a subunit; and the optical fiber core cables positioned at side edges of the neighboring subunits are partially coupled with each other at a given intervals in the longitudinal direction, wherein: the plurality of the optical fiber core cables is sent out in a parallel manner with intervals provided therebetween, in the longitudinal direction of the optical fiber core cables, an uncured resin is applied to the plurality of the optical fiber core cables, a plurality of interrupt members, which are arranged corresponding to positions between each of the optical fiber core cables, are moved to interrupt the uncured resin, and positions are continuously changed at which the uncured resin is interrupted and positions at which the uncured resin is ejected without interruption by the interrupt members; and positions at which the plurality of the optical fiber core cables are arranged in parallel, concentrated and in contact with each other, are irradiated with resin curing energy required for the uncured resin coated on the optical fiber core cables to cure, thereby forming coupled portions at which the optical fiber core cables are coupled to each other.

(Configuration 6)

In the manufacturing device of the optical fiber ribbon having the configuration 5, upon applying the resin for coupling the optical fiber core cables configuring the subunit with each other, movements of the respective interrupt members are set to a first period and set to different phases with each other, and upon applying the resin for coupling the subunits with each other, movements of the respective interrupt members are set to a second period which is longer than the first period and set to different phases with each other.

(Configuration 7)

In the manufacturing device of the optical fiber ribbon having the configuration 5, upon applying the resin for coupling the optical fiber core cables configuring the subunit with each other, movements of the respective interrupt members are set to: a first period; and different phases with each other for the coupling of the neighboring optical fiber core cables in a width direction of the optical fiber ribbon, and upon applying the resin for coupling the subunits with each other, movements of the respective interrupt members are set to a second period which is longer than the first period.

(Configuration 8)

An optical fiber ribbon according to the present invention is manufactured with the manufacturing device of the optical fiber ribbon having any one of the configurations 5 to 7.

In the optical fiber ribbon manufactured in the present invention, the plurality of optical fiber core cables are sent out in the parallel manner with the intervals provided therebetween, the uncured resin is applied to the plurality of optical fiber core cables, the plurality of interrupt members are moved, the interrupt members being arranged corresponding to the positions between each of the optical fiber core cables to interrupt the uncured resin, the positions at which the uncured resin is interrupted by the interrupt members and the positions at which the uncured resin is ejected without interruption are continuously changed, and the uncured resin is cured at the positions where the optical fiber core cables are arranged in parallel, concentrated and in contact with each other, thereby forming the coupled portions in which the optical fiber core cables are coupled with each other. Therefore, intervals and fixed lengths between the coupled portions can be changed for every neighboring optical fiber cables, making the subunits be distinguished from each other easily.

In other words, the present invention provides a manufacturing method of a multi-core optical fiber ribbon in which a plurality of optical fiber core cables are arranged in parallel and the neighboring optical fiber core cables are coupled to each other at given intervals, wherein subunits are easily distinguished from each other; a manufacturing device for an optical fiber ribbon implementing the manufacturing method; and an optical fiber ribbon manufactured with the manufacturing method.

DETAILED DESCRIPTION OF THE EMBODIMENT OF THE INVENTION

Hereinafter, embodiments of the present invention are described with reference to the drawings.

First Embodiment

In a manufacturing method for an optical fiber ribbon concerned, subunits are configured by arranging a plurality of optical fiber core cables in parallel and partially coupling the neighboring optical fiber core cables with each other at given intervals in a longitudinal direction. Moreover, the plurality of subunits arranged in parallel are partially coupled with each other by coupling together the optical fiber core cables positioned at side edges of the respective subunits at given intervals in the longitudinal direction, thereby manufacturing the optical fiber ribbon.

Figure 1:
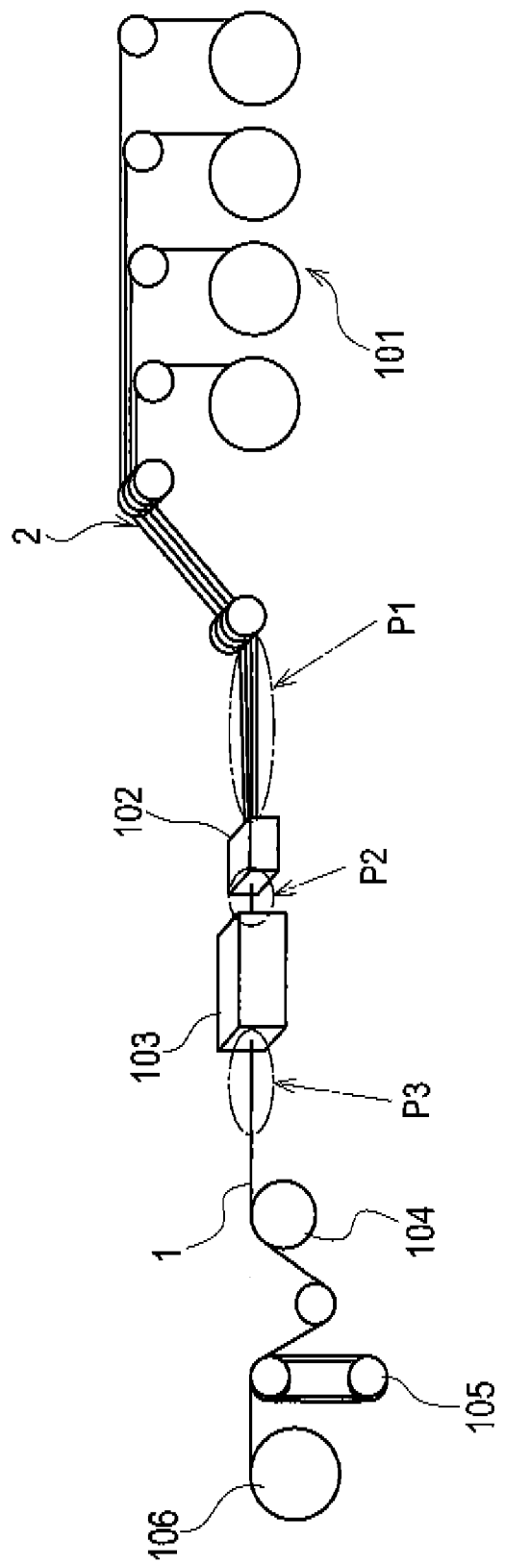
FIG. 1 is a perspective view showing manufacturing processes of a manufacturing method of an optical fiber ribbon according to a first embodiment of the present invention.

FIG. 1 is a perspective view showing manufacturing processes of the manufacturing method for the optical fiber ribbon according to a first embodiment of the present invention.

Specifically, a plurality of optical fiber core cables 2 are sent out from a plurality of optical fiber core cable sending-out devices 101 and sent to an intermittent resin-coating device 102. The respective optical fiber core cables 2 are sent to the intermittent resin-coating device 102, so that at a location P1, the plurality of optical fiber core cables 2 are arranged in a parallel manner with intervals provided therebetween.

In addition, the optical fiber core cable 2 may not only be a single optical fiber, but may also be the one in which a plurality of optical fibers are integrally formed, or the one in which a plurality of optical fibers are coupled in a tape form.

The intermittent resin-coating device 102 performs a resin coating process for coating a resin material intermittently at a constant period onto predetermined positions of each of the sent-out optical fiber core cables 2. The resin material used for coating is, for example, an ultraviolet curing resin and the like, which is coated in a uncured state and cured thereafter to couple the optical fiber core cables with each other and becomes a coupled portion.

The intermittent resin-coating device 102 performs: coating of the uncured resin on the plurality of optical fiber core cables; moving of a plurality of interrupt members which are included in the intermittent resin-coating device 102 and arranged at positions corresponding to gaps between the respective optical fiber core cables and interrupt uncured resin; and continuous changing of interrupting and ejecting positions of the uncured resin using the interrupt members. In other words, when the interrupt member is present, the uncured resin is interrupted and the optical fiber core cables 2 are separated from each other. When the interrupt member is not present, the uncured resin is ejected because the interrupt member does not interrupt the uncured resin.

Figure 2:
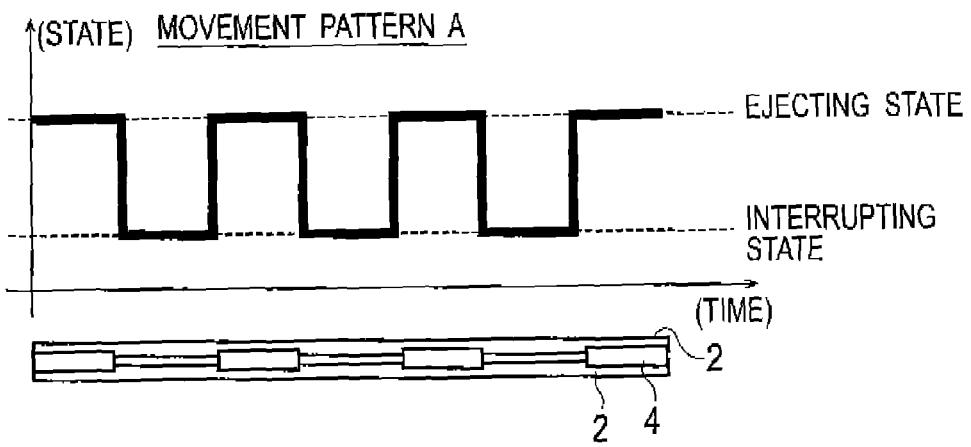
FIG. 2 is a graph showing a moving pattern of an interrupt member.

FIG. 2 is a graph showing a moving pattern of an interrupt member.

By the movement of the interrupt member, as shown in FIG. 2, resin coated portions of the optical fiber core cables 2 or coupled portions 4 and portions on which the resin is not coated or uncoupled portions are famed between the optical fiber core cables 2.

A moving period or a phase of the interrupt member can be changed for every arbitrary optical fiber core cables 2. That is, an interval between the coupled portions 4 of the optical fiber core cables in the longitudinal direction can be set for every optical fiber core cable 2.

Figure 3:
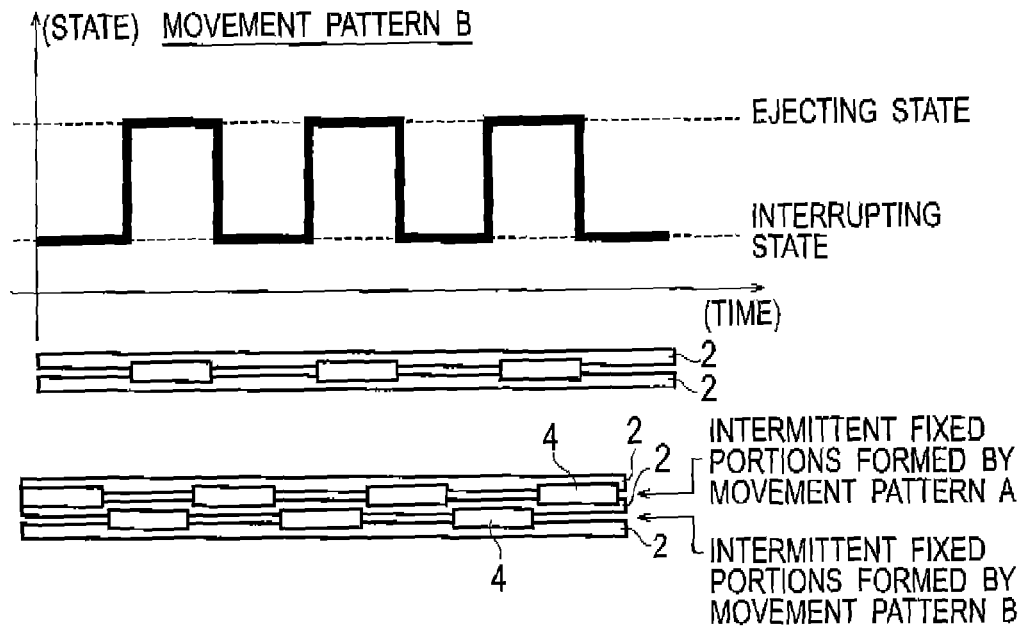
FIG. 3 is a graph showing a different moving pattern of the interrupt member.

FIG. 3 is a graph showing a different moving pattern of the interrupt member.

By changing a moving pattern of the interrupt member, as shown in FIG. 3, positions, lengths and the like of the coupled portions 4 formed between the optical fiber core cables 2 in the optical fiber ribbon can be changed in the width direction of the optical fiber ribbon. Also, a change of a pattern means a change of a moving period or phase of the interrupt members. A pattern A shown in FIG. 2 and a pattern B shown in FIG. 3 have the same period but phases thereof are changed from each other, that is, the patterns A and B are identical in periods and different in phases.

After passing the intermittent resin-coating device 102, each of the optical fiber core cables 2 is sent to a resin curing device 103, in a state of the resin being coated thereon intermittently between the respective optical fiber core cables 2 at a location P2 shown in FIG. 1. The resin-curing device 103 cures the resin material of the uncured resin coated on the positions where the plurality of optical fiber core cables 2 are arranged in parallel, concentrated and in contact with each other, either by irradiating the resin material with resin curing energy required for the uncured resin coated on the optical fiber core cables 2 to cure, such as an ultraviolet ray, or by heating the resin material, thereby performing a coupled portion resin-curing process for forming the coupled portions that connect the optical fiber core cables 2 with each other. At a location P3 after passing the resin-curing device 103, the resin is cured in a state of being intermittently coated on the respective optical fiber core cables 2, forming an optical fiber ribbon 1 which is in a state of the final form. Thereafter, the optical fiber ribbon 1 is wound up by a winding device 106 via a picking up device 104 and a dancer 105.

Figure 4:
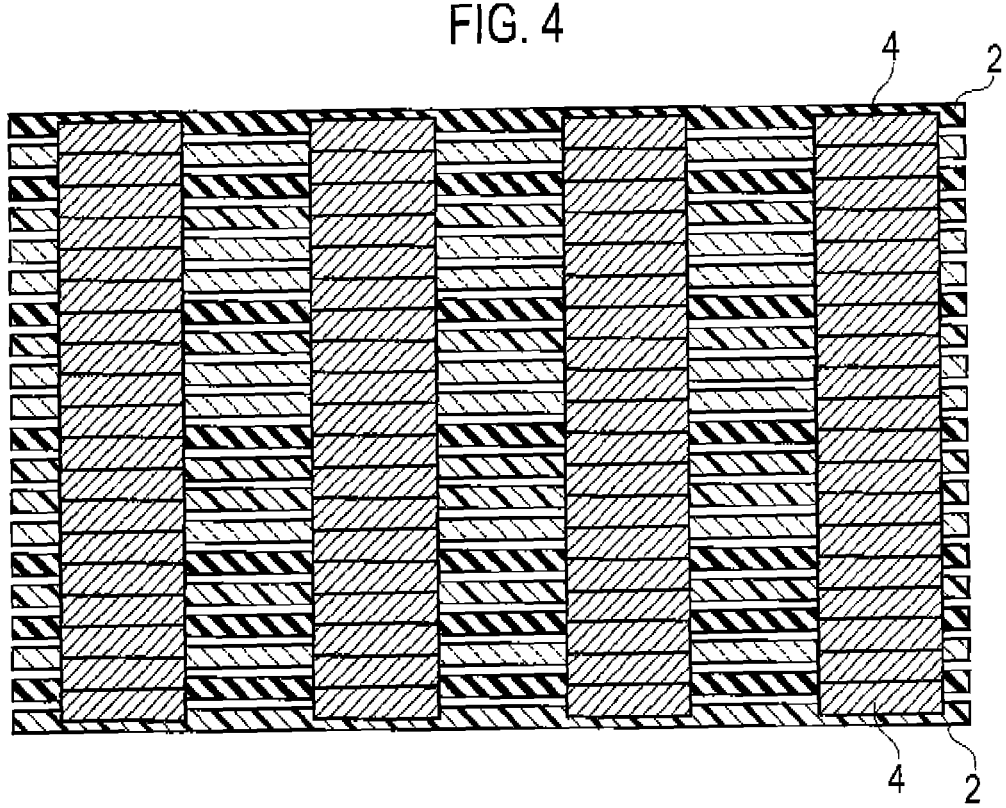
FIG. 4 is a plan view showing a configuration of the optical fiber ribbon according to the first embodiment.

FIG. 4 is a plan view showing a configuration of the optical fiber ribbon according to the first embodiment.

As shown in FIG. 4, the optical fiber ribbon is manufactured by arranging 20 optical fiber core cables 2 in parallel and coating the resin thereon while moving the interrupt members. Here, the optical fiber core cables 2 are arranged by repeatedly using cables having a combination of, for example, a first color, white, brown and gray. The first color is selected from blue, yellow, green, red and purple, so that 4-core subunits can be distinguished from each other. The coupled portions 4 between the optical fiber core cables 2 are formed by using the above described moving pattern A.

Because each of the optical fiber core cables 2 usually has a very thin outer diameter of about 0.25 mm, distinguishing color thereof is difficult. Especially under an environment having insufficient lighting, among 20 optical fiber core cables, it is extremely difficult to accurately distinguish the color of an arbitrary optical fiber core cable 2 or subunit. Further, because the number of colors usable by the optical fiber core cables 2 is limited, white, brown and grey are used repeatedly in this embodiment. The colors are used for the plurality of optical fiber core cables 2 in the same optical fiber ribbon, therefore the distinguishability thereof becomes lower than that of the respective first colors, which are blue, yellow, green, red and purple, used for only one optical fiber core cable in the same optical fiber ribbon.

Figure 5:
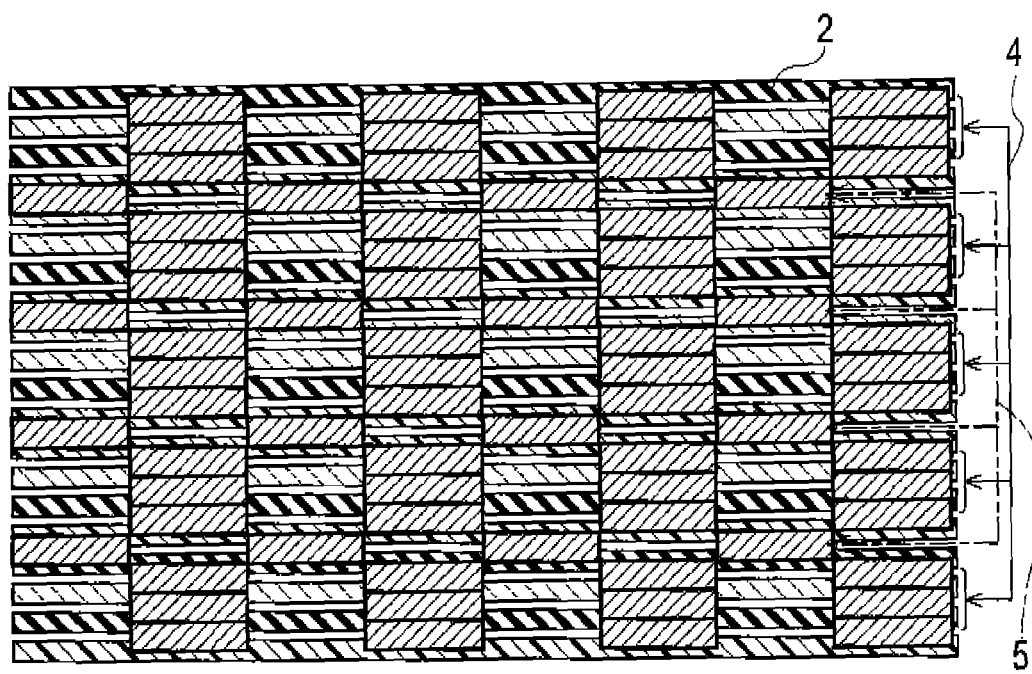
FIG. 5 is a plan view showing a configuration of another example of the optical fiber ribbon according to the first embodiment.

FIG. 5 is a plan view showing a configuration, of another example of the optical fiber ribbon according to the first embodiment.

As shown in FIG. 5, the optical fiber ribbon having the same optical fiber core cables and colors as the one described above is manufactured by using two types of moving patterns. The difference from the optical fiber ribbon illustrated in FIG. 4 is that in the optical fiber ribbon concerned, coupled portions 5 between the 4th and 5th, the 8th and 9th, the 12th and 13th, and the 16th and 17th optical fiber core cables 2 respectively are formed by using the above mentioned moving pattern B.

In the optical fiber ribbon concerned, the coupled portions 4 coupling the optical fiber core cables 2 forming one subunit (4-core optical fiber core cables) and the coupled portions 5 coupling the subunits with each other respectively have the different moving patterns A and B, making positions of the formed coupled portions 4 and 5 differ from each other. Accordingly, the subunits can be distinguished easily.

Second Embodiment

In this embodiment, distinguishability between the subunits in an optical fiber ribbon is improved by making repeated periods and phases different for respective moving patterns of the interrupt members.

Figure 6:
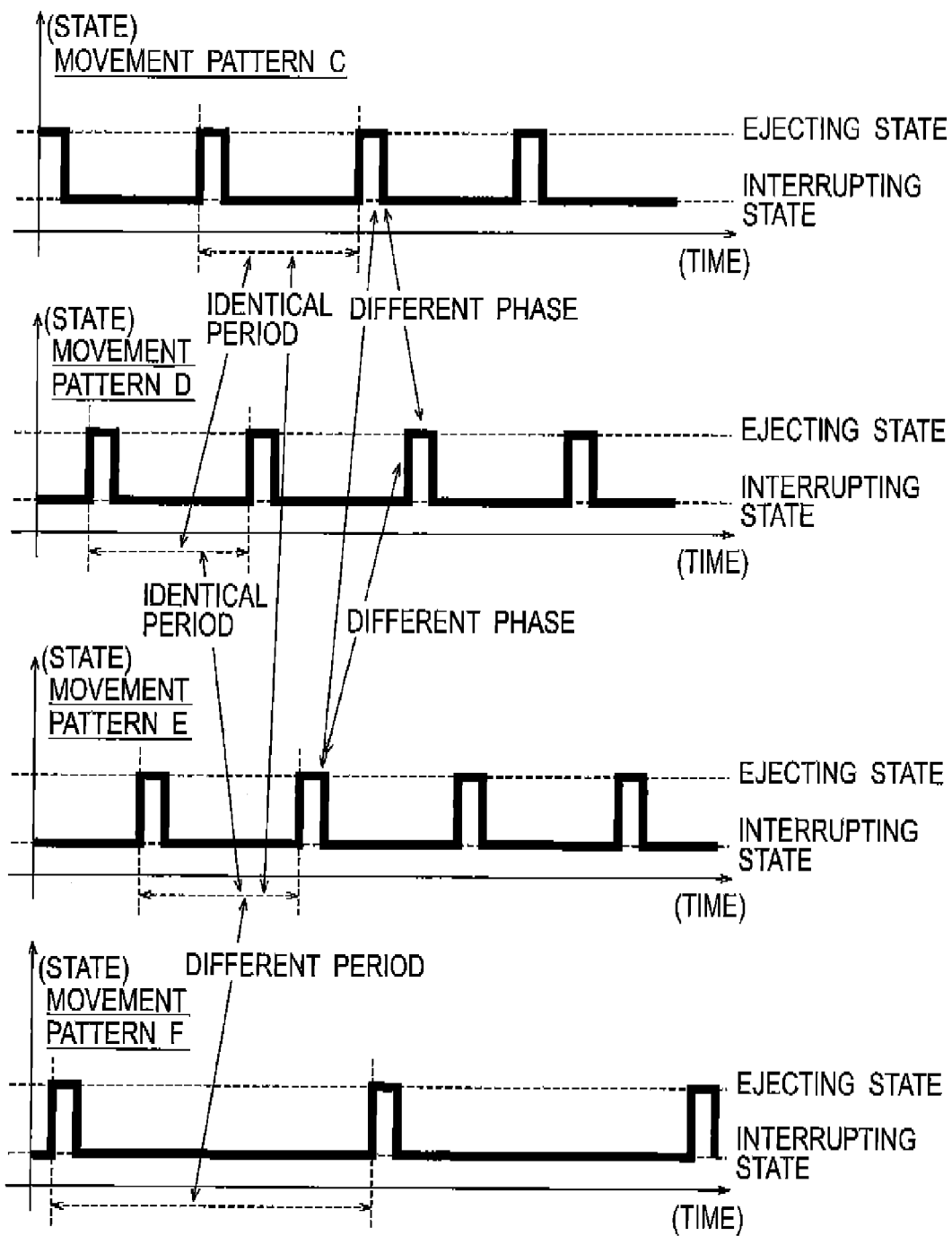
FIG. 6 is a graph showing moving patterns of interrupt members according to a second embodiment.

FIG. 6 is a graph showing the moving patterns of the interrupt members according to the second embodiment.

In this embodiment, as shown in FIG. 6, the optical fiber ribbon is manufactured by using movement patterns C to F of which respective periods and phases have a constant relationship with each other. The coupled portions 4 within each subunit are formed by using the movement patterns C, D and E having the same period but different phases. The coupled portions 5 coupling the subunits with each other are formed by using the movement pattern F having a different period from that of the coupled portions 4 within each subunit.

Figure 7:
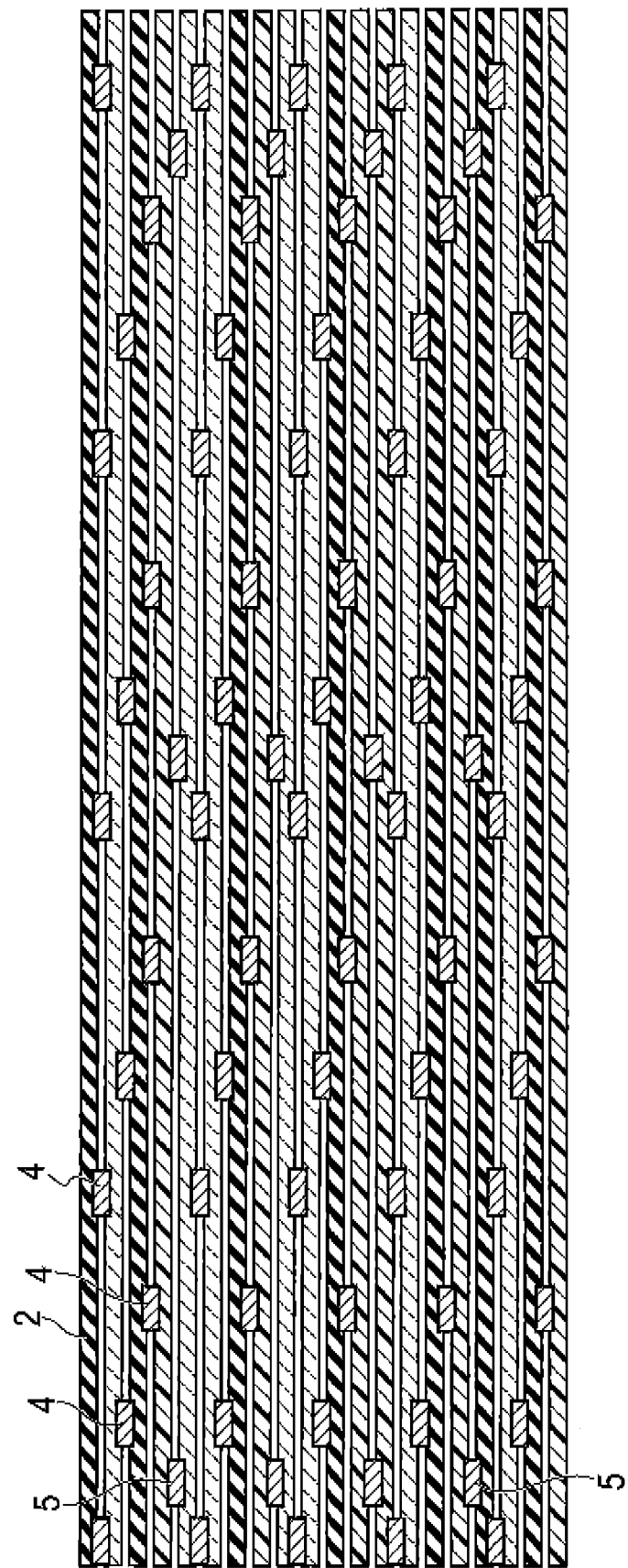
FIG. 7 is a plan view showing a configuration of an optical fiber ribbon according to the second embodiment.

FIG. 7 is a plan view showing a configuration of the optical fiber ribbon according to the second embodiment.

As shown in FIG. 7, the 20-core optical fiber ribbon is manufactured. In the optical fiber ribbon thus manufactured, a period of the coupled portions 4 within each subunit is different from that of the coupled portions 5 coupling the subunits with each other, making it easier for the subunits to be distinguished from each other.

Further, in the width direction of the optical fiber ribbon, the coupled portions 4 are not formed successively in the neighboring gaps between the core cables 2, therefore, the optical fiber ribbon can be deformed (bent) easily in the width direction.

Third Embodiment

Figure 8:
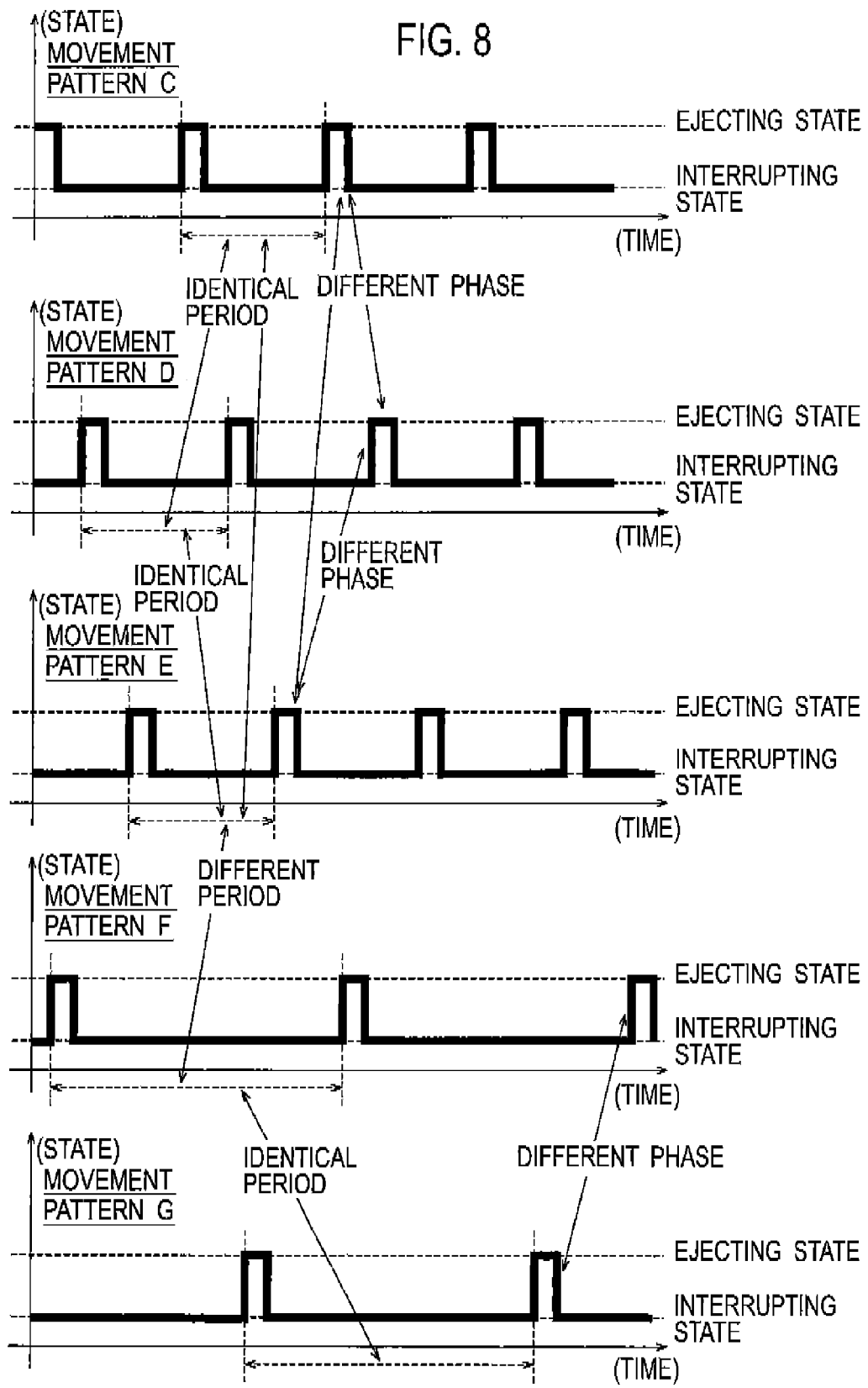
FIG. 8 is a graph showing moving patterns of interrupt members according to a third embodiment.

FIG. 8 is a graph showing moving patterns of the interrupt members according to a third embodiment.

In a case of reducing the number of coupled portions present in the same position in the width direction of an optical fiber ribbon, phases can be made different as shown in FIG. 8 for moving patterns of the interrupt members for forming the coupled portions between the subunits. In this case, two types of patterns, F and G, are used for the movement patterns for forming the coupled portions between the subunits.

Figure 9:
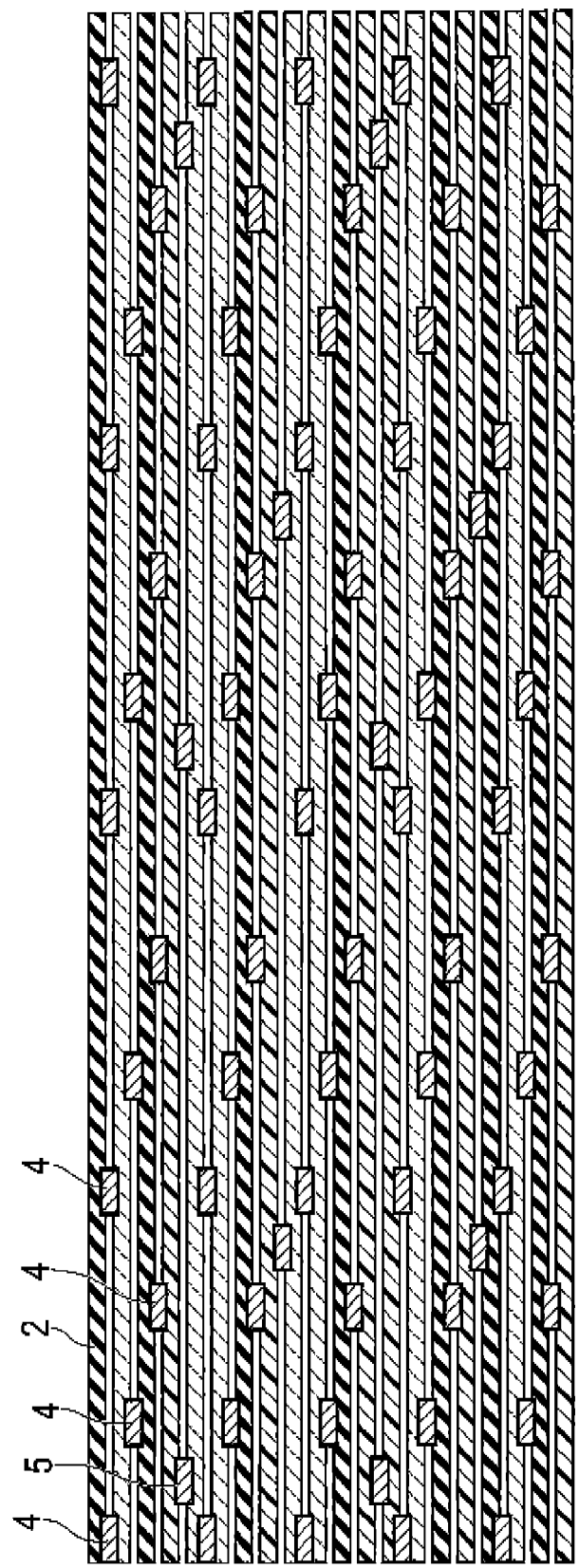
FIG. 9 is a plan view showing a configuration of an optical fiber ribbon according to the third embodiment.

FIG. 9 is a plan view showing a configuration of the optical fiber ribbon according to the third embodiment.

As shown in FIG. 3, the optical fiber ribbon is manufactured by using two types of patterns, F and G, for the movement patterns for forming the coupled portions 5 between the subunits.

Moreover, when the period of the movement patterns for forming the coupled portions 4 within each subunit is set to integral multiple of that of the movement patterns for forming the coupled portions 5 between the subunits, the coupled portions 5 between the subunits and the coupled portions 4 within each subunit adjacent thereto do not overlap in the width direction of the optical fiber ribbon. Accordingly, the optical fiber ribbon can be deformed (bent) easily.

Fourth Embodiment

Figure 10:
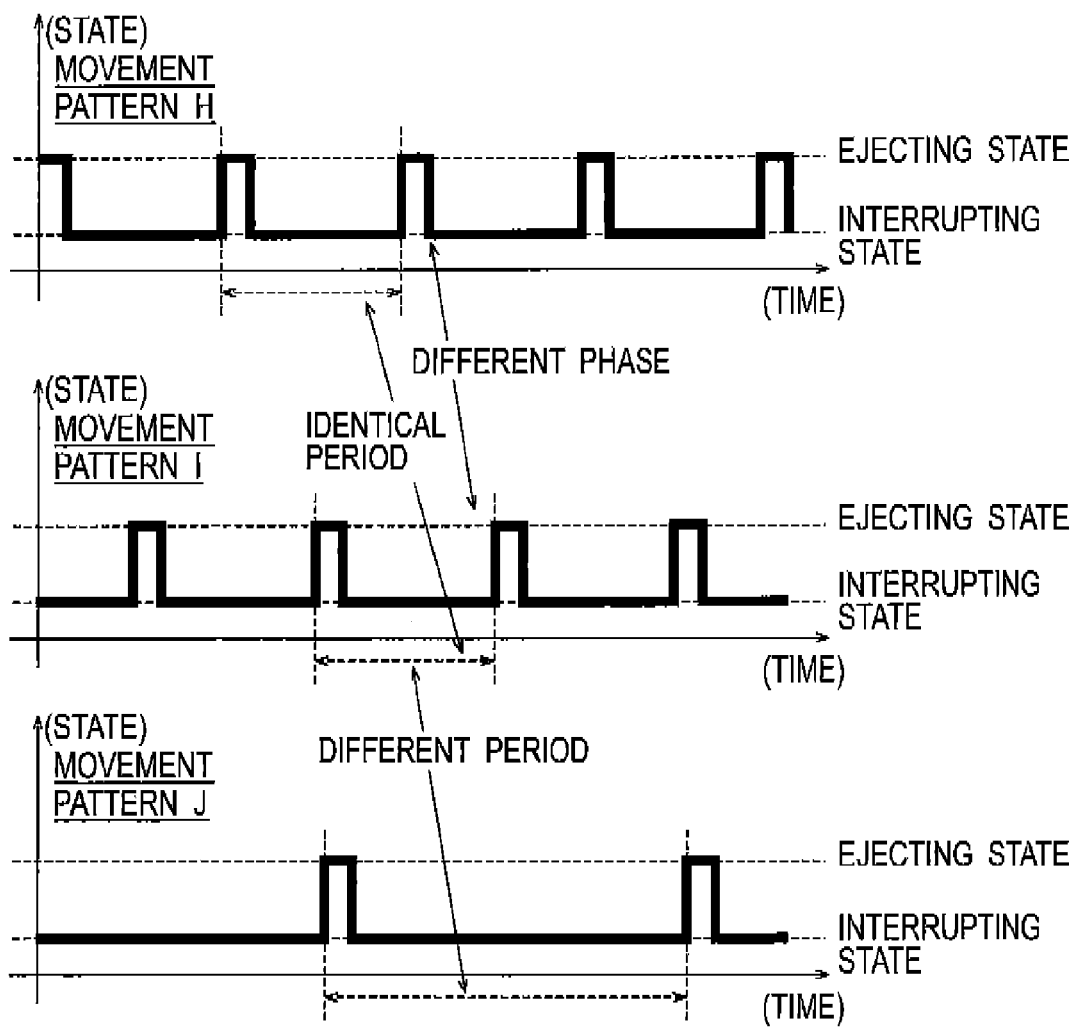
FIG. 10 is a graph showing moving patterns of interrupt members according to a fourth embodiment.

FIG. 10 is a graph showing moving patterns of the interrupt members according to a fourth embodiment.

As shown in FIG. 10, the coupled portions 4 within each subunit can be formed by using movement patterns H and I, and the coupled portions 5 between the subunits can be formed by using a movement pattern J.

Figure 11:
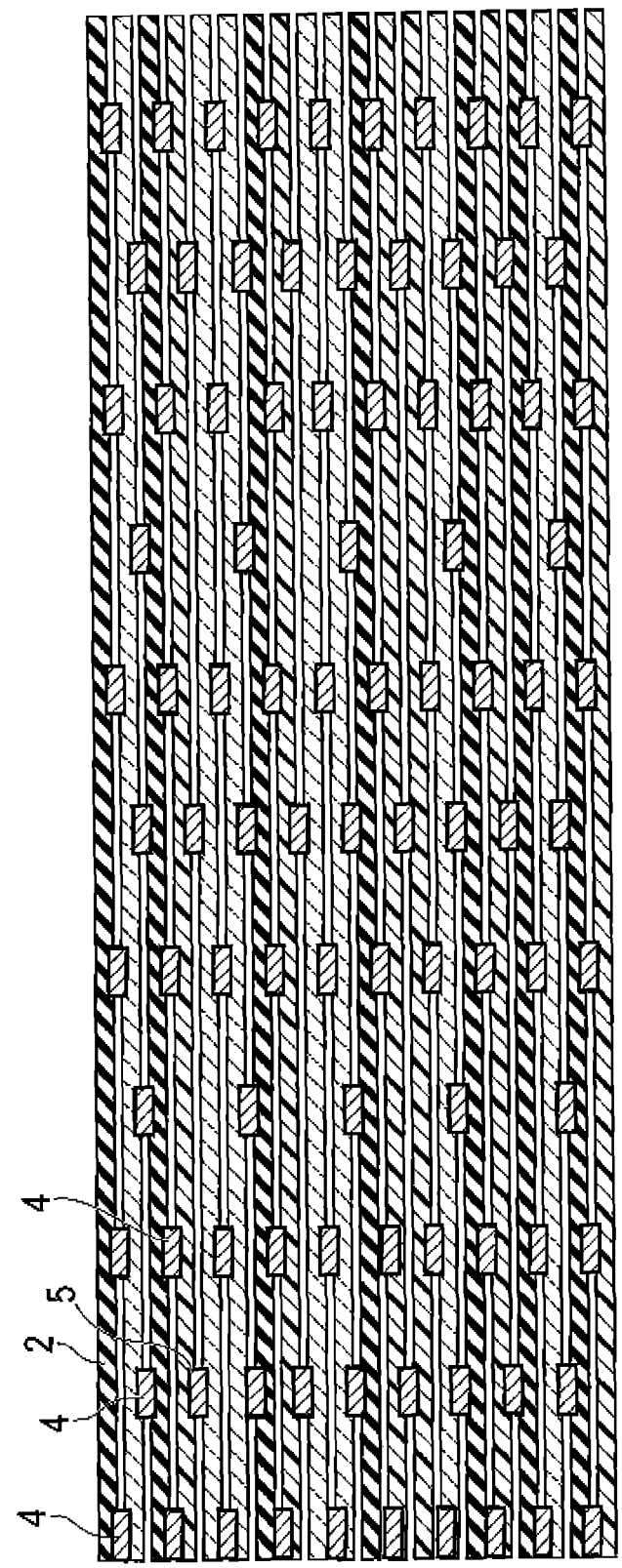
FIG. 11 is a plan view showing a configuration of an optical fiber ribbon according to the fourth embodiment.

FIG. 11 is a plan view showing a configuration of an optical fiber ribbon according to the fourth embodiment.

In the optical fiber ribbon concerned, as shown in FIG. 11, among four optical fiber core cables 2 configuring the subunit, two in the both ends are respectively coupled with each other by using the movement pattern H at identical period and phase. Then, the respective coupled pairs are coupled together by the coupled portions 4 formed by using the movement pattern I at the identical period to but different phase from that of the movement pattern H. In the optical fiber ribbon concerned, difference between the coupled portions 4 within each subunit and the coupled portions 5 between the subunits becomes prominent, making the subunits be easily distinguished from each other.

Fifth Embodiment

Figure 12:
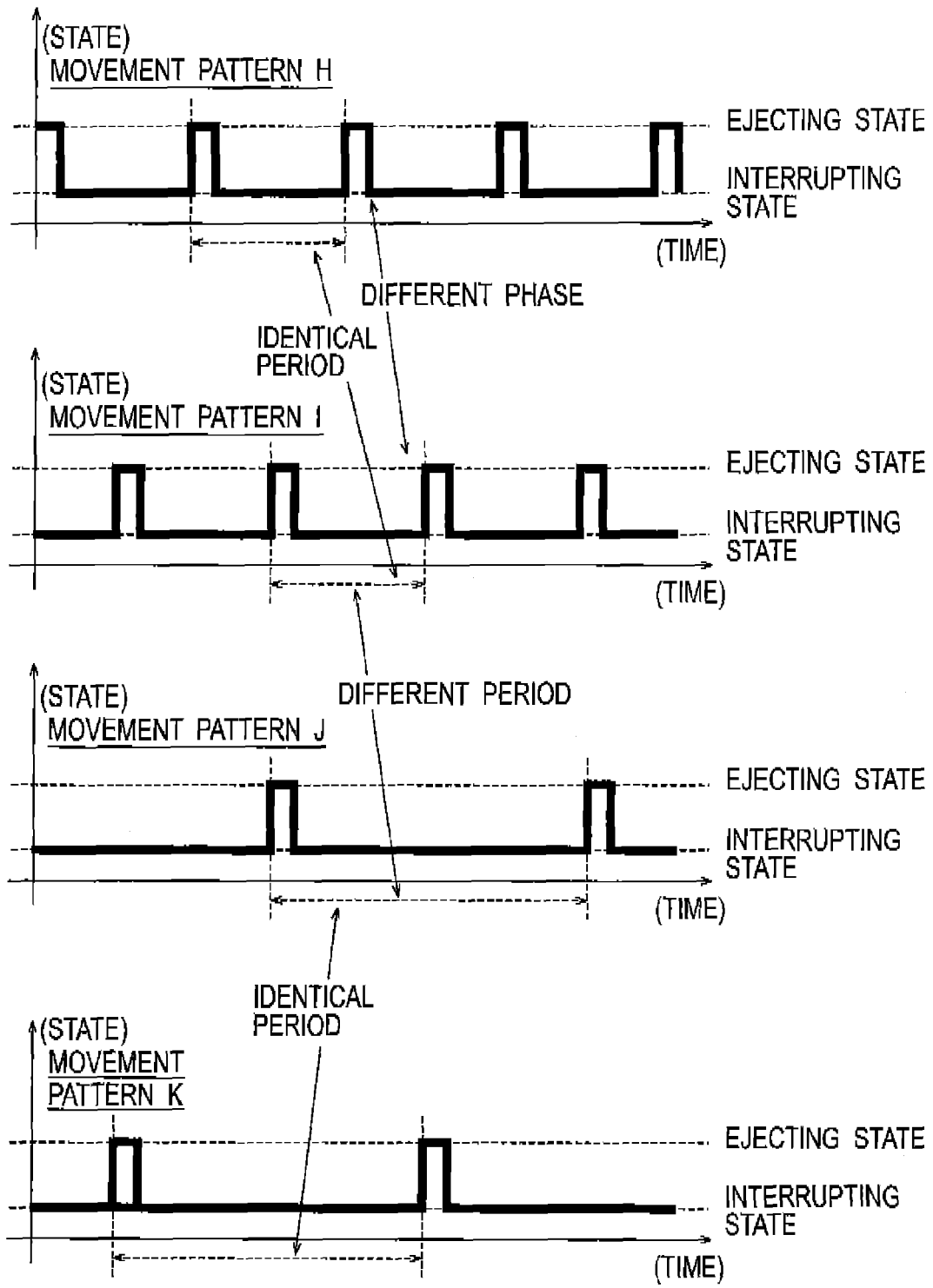
FIG. 12 is a graph showing moving patterns of interrupt members according to a fifth embodiment

FIG. 12 is a graph showing moving patterns of the interrupt members according to a fifth embodiment.

In this embodiment, as in the above described fourth embodiment, a plurality of movement patterns is used for forming the coupled portions 4 within each subunit. In other words, a movement pattern K is added as shown in FIG. 12 to the movement patterns used in the fourth embodiment.

Figure 13:
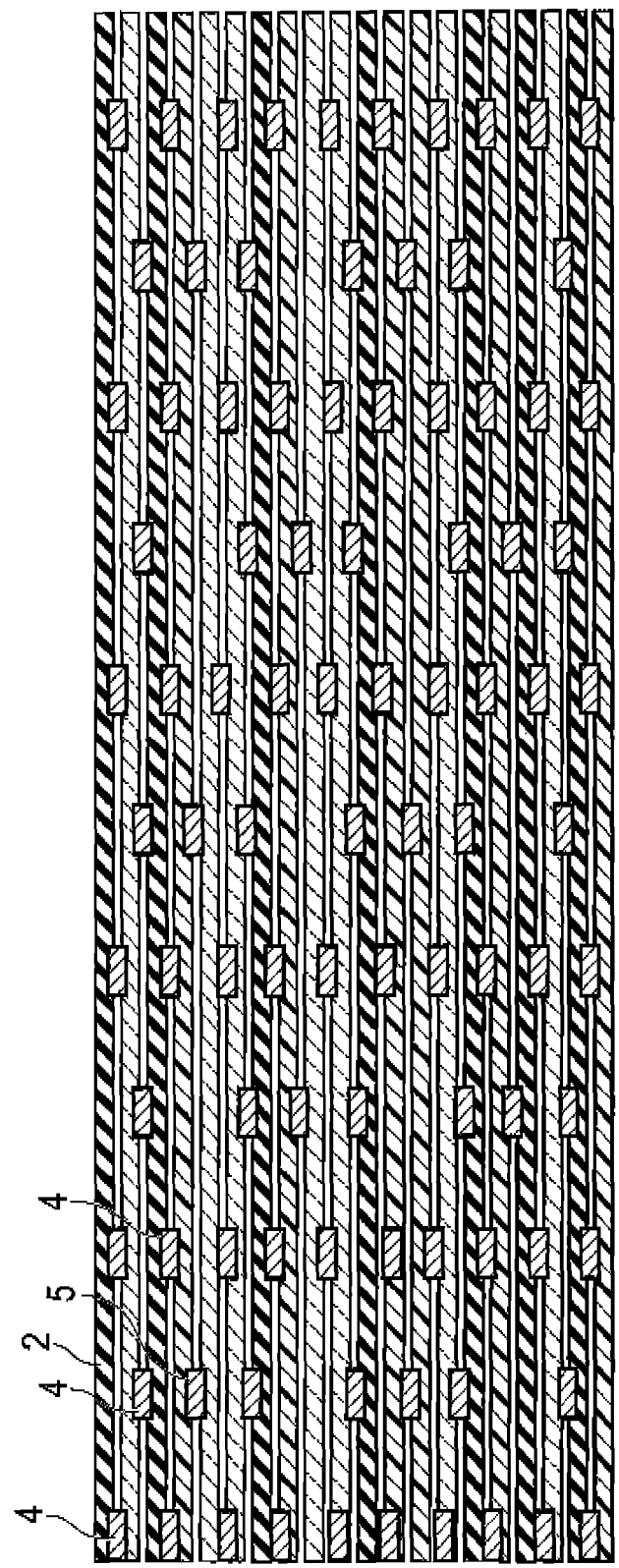
FIG. 13 is a plan view showing a configuration of an optical fiber ribbon according to the fifth embodiment.
Figure 14:
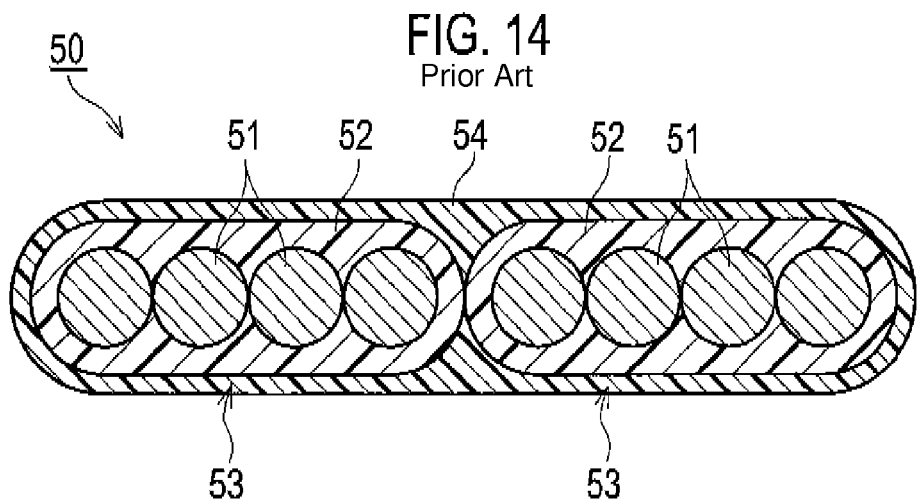
FIG. 14 is a cross-sectional view of a conventional optical fiber ribbon.
Figure 15A:
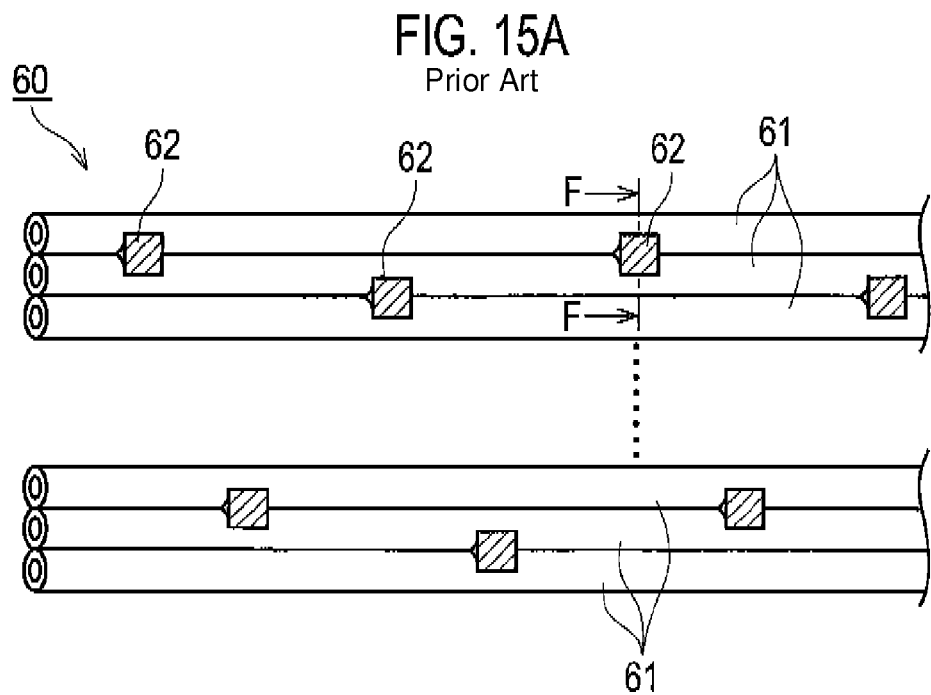
FIG. 15A is a plan view and FIG. 15B is a cross-sectional view in a line F-F of FIG. 15A of another conventional optical fiber ribbon.
Figure 15B:
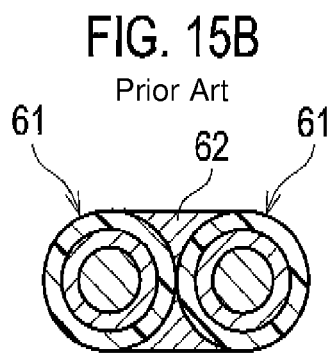

FIG. 13 is a plan view showing a configuration of an optical fiber ribbon according to the fifth embodiment.

As shown in FIG. 13, the optical fiber ribbon is manufactured by using the movement patterns including the movement pattern K. In the optical fiber ribbon concerned, difference between the coupled portions 4 within each subunit and the coupled portions 5 between the subunits becomes distinct, making the subunits be easily distinguished from each other.

Sixth Embodiment

In this embodiment, ratios between a period of the coupled portions 4 within each subunit and a period of the coupled portions 5 between the subunits are evaluated. That is, the optical fiber ribbons are manufactured while varying combinations of the periods of the coupled portions 4 and 5 for inside the subunit and for between the subunits.

Configurations of the optical fiber ribbons are the same as those indicated in the above described third and fifth embodiments, respectively. Regarding the optical fiber ribbons as above, the distinguishability between the subunits and also dividing property in a unit of subunits are evaluated. Moreover, an operation of manually aligning the optical fiber ribbons is performed together. Contents of the manufacturing and evaluation results are shown in [Table 1] below.

In any of the optical fiber ribbons, regarding the distinguishability between the subunits, the subunits (gaps between the subunits) could be distinguished from each other easily for those having a period of the coupled portions 5 between the subunits 1.5 times as much as that of the coupled portions 4 within each subunit. This was because when the alignment of the optical fiber core cables 2 in the optical fiber ribbon was widened in the width direction, the gaps generated between the subunits became wider than the intervals between the optical fiber core cables 2 within the respective subunits. Further, operations of holding the optical fiber ribbon by hand and inserting a jig into the optical fiber ribbon were easily achieved by dividing in a unit of subunits.

On the other hand, when the period of the coupled portions 4 within each subunit was lengthened, lengths increased at portions where the optical fiber core cables 2 were not coupled to each other. In this case, when the period of the coupled portions 5 between the subunits was set longer than that of the coupled portions 4 within each subunit, lengths at portions where the subunits were not coupled to each other became even greater than that at portions where the optical fiber core cables 2 were not coupled to each other. Accordingly, the alignment of all of the subunits became difficult.

From the above results, it has become clear that the optical fiber ribbon has excellent usability and the subunits configuring the optical fiber ribbon can be distinguished from each other well when: a period of the coupled portions 5 between the subunits is made longer than that of the coupled portions 4 within each subunit; the period of the coupled portions 4 is set to 250 mm or less; and the period of the coupled portions 5 is set to 500 mm or less.

What is claimed is:

1. A manufacturing method for an optical fiber ribbon, in which: a plurality of optical fiber core cables are arranged in parallel and the neighboring optical fiber core cables are coupled with each other at certain points with given intervals therebetween in a longitudinal direction to form a subunit that is a unit to be divided; and the optical fiber core cables positioned at side edges of the neighboring subunits are coupled with each other at certain points with given intervals therebetween in the longitudinal direction, comprises:

a resin applying step for sending out the plurality of the optical fiber core cables in a parallel manner with intervals provided therebetween, in the lateral direction of the optical fiber core cables, applying an uncured resin to the plurality of the optical fiber core cables, moving a plurality of interrupt members which are included in an

TABLE 1

| Periods between subunits* | Property between subunits | | Usability of optical fiber ribbon | | | | | |
| --- | --- | --- | --- | --- | --- | --- | --- | --- |
| | Distinguish-ability | Dividing property | Periods within a subunit | | | | | |
| | | | 10 mm | 25 mm | 50 mm | 100 mm | 250 mm | 300 mm |
| 0.5 | NG | F | VG | VG | VG | VG | VG | NG(2) |
| 1.5 | G | G | VG | VG | VG | VG | VG | NG(2) |
| 2 | G | G | VG | VG | VG | VG | VG | NG(2) |
| 2.5 | G | G | VG | VG | VG | VG | NG(2) | NG(2) |
| 3 | G | G | VG | VG | VG | VG | NG(2) | NG(2) |
| 3.5 | G | G | VG | VG | VG | VG | NG(2) | NG(2) |
| 4 | G | G | VG | VG | VG | VG | NG(2) | NG(2) |

*A ratio with respect to a period within a subunit
Description of Symbols:
NG: Not achieved easily
F: Acceptable but some are not achieved easily (one having a period of 10 mm within each subunit has a period of 5 mm between subunits and there was difficulty)
G: Achieved easily
NG(2): Difficult to align optical fiber core cables inside an optical fiber ribbon
VG: Easily achieved in both: taking out and dividing of an optical fiber core cables and aligning of optical fiber core cables inside an optical fiber ribbon intermittent resin-coating device and arranged corresponding to positions between each of the optical fiber core cables to interrupt the uncured resin, and periodically changing positions at which the uncured resin is interrupted and positions at which the uncured resin is ejected without interruption by the interrupt members; and a resin curing step for irradiating positions, at which the plurality of the optical fiber core cables are arranged in parallel, concentrated and in contact with each other, with resin curing energy required for the uncured resin coated on the optical fiber core cables to cure, thereby forming coupled portions at which the optical fiber core cables are coupled to each other, wherein first coupled portions between the subunits and second coupled portions within each subunit adjacent thereto do not overlap in the width direction of the optical fiber ribbon, each interval between the adjacent first coupled portions being longer than each interval between the adjacent second coupled portions, wherein each of the first coupled portions overlaps with at least one of the other first coupled portions in the width direction of the optical fiber ribbon, each of the second coupled portions does not overlap with the other coupled portions within the same subunit in the width direction of the optical fiber ribbon and overlaps with one of the coupled portions within the other subunit in the width direction of the optical fiber ribbon, and wherein a moving period or phase of the interrupt members is changed for adjacent optical fiber core cables.

2. The manufacturing method of the optical fiber ribbon according to claim 1, wherein upon applying the resin for coupling the optical fiber core cables configuring the subunit with each other, movements of the respective interrupt members are set to a first period and set to different phases with each other, and upon applying the resin for coupling the subunits with each other, movements of the respective interrupt members are set to a second period which is longer than the first period and set to different phases with each other.

3. The manufacturing method of the optical fiber ribbon according to claim 1, wherein upon applying the resin for coupling the optical fiber core cables configuring the subunit with each other, movements of the respective interrupt members are set to: a first period; and different phases with each other for the coupling of the neighboring optical fiber core cables in a width direction of the optical fiber ribbon, and upon applying the resin for coupling the subunits with each other, movements of the respective interrupt members are set to a second period which is longer than the first period.

4. An optical fiber ribbon manufactured with the manufacturing method of the optical fiber ribbon according to claim 1.

5. A manufacturing device for an optical fiber ribbon, in which: a plurality of optical fiber core cables are arranged in parallel and the neighboring optical fiber core cables are coupled with each other at certain points with given intervals therebetween in a longitudinal direction to form a subunit that is a unit to be divided; and the optical fiber core cables positioned at side edges of the neighboring subunits are coupled with each other at certain points with given intervals therebetween in the longitudinal direction, wherein the plurality of the optical fiber core cables is sent out in a parallel manner with intervals provided therebetween, in the lateral direction of the optical fiber core cables, an uncured resin is applied to the plurality of the optical fiber core cables, a plurality of interrupt members, which are included in an intermittent resin-coating device and arranged corresponding to positions between each of the optical fiber core cables, are moved to interrupt the uncured resin, and positions are periodically changed at which the uncured resin is interrupted and positions at which the uncured resin is ejected without interruption by the interrupt members; and positions at which the plurality of the optical fiber core cables are arranged in parallel, concentrated and in contact with each other, are irradiated with resin curing energy required for the uncured resin coated on the optical fiber core cables to cure, thereby forming coupled portions at which the optical fiber core cables are coupled to each other wherein first coupled portions between the subunits and second coupled portions within each subunit adjacent thereto do not overlap in the width direction of the optical fiber ribbon, each interval between the adjacent first coupled portions being longer than each interval between the adjacent second coupled portions, and where each of the first coupled portions overlaps with at least one of the other first coupled portions in the width direction of the optical fiber ribbon, each of the second coupled portions does not overlap with the other coupled portions within the same subunit in the width direction of the optical fiber ribbon and overlaps with one of the coupled portions within the other subunit in the width direction of the optical fiber ribbon.

6. The manufacturing device of the optical fiber ribbon according to claim 5, wherein upon applying the resin for coupling the optical fiber core cables configuring the subunit with each other, movements of the respective interrupt members are set to a first period and set to different phases with each other, and upon applying the resin for coupling the subunits with each other, movements of the respective interrupt members are set to a second period which is longer than the first period and set to different phases with each other.

7. The manufacturing device of the optical fiber ribbon according to claim 5, wherein upon applying the resin for coupling the optical fiber core cables configuring the subunit with each other, movements of the respective interrupt members are set to: a first period; and different phases with each other for the coupling of the neighboring optical fiber core cables in a width direction of the optical fiber ribbon, and upon applying the resin for coupling the subunits with each other, movements of the respective interrupt members are set to a second period which is longer than the first period.

8. An optical fiber ribbon manufactured with the manufacturing device of the optical fiber ribbon according to claim 5.

* * * * *